United States Patent [19]
Weber

[11] 4,424,601
[45] Jan. 10, 1984

[54] FORMING AND EMBOSSING TEMPLATE

[76] Inventor: Eleanor J. Weber, 440 Sand Dollar Dr., La Selva Beach, Calif. 95076

[21] Appl. No.: 6,360

[22] Filed: Jan. 25, 1979

[51] Int. Cl.³ .............................. B25F 1/00; B26B 3/00
[52] U.S. Cl. ........................................ 7/113; 30/302; 425/298; D7/43
[58] Field of Search .......................... 426/383; D7/43; 428/101; 425/104, 298; 30/302; 7/113

[56] References Cited

U.S. PATENT DOCUMENTS

| | | | |
|---|---|---|---|
| D. 28,312 | 2/1898 | Koller | D7/43 |
| D. 128,363 | 7/1941 | Bricco | D7/43 |
| D. 159,715 | 8/1950 | Butcher | D7/43 |
| D. 220,711 | 5/1971 | Swett | D7/43 |
| D. 221,291 | 7/1971 | Futter | D7/43 |
| D. 246,412 | 11/1977 | Brunner | D7/43 |
| D. 246,495 | 11/1977 | Montano | D7/43 |
| 435,448 | 9/1890 | Prahm | 7/110 |
| 590,365 | 9/1897 | Dechant | 249/104 |
| 713,897 | 11/1902 | Maxwell | 249/104 |
| 1,041,958 | 10/1912 | Buckau | 249/104 |
| 2,612,123 | 9/1952 | Nord | D7/43 |
| 3,279,397 | 10/1966 | Swett et al. | D7/43 |
| 3,456,346 | 7/1969 | Snyder | D7/43 |
| 3,700,204 | 10/1972 | Swett et al. | 249/104 |
| 3,754,327 | 8/1973 | Lisa | D7/43 |
| 3,921,801 | 11/1975 | Sway | 249/104 |

FOREIGN PATENT DOCUMENTS 6734 of 1915 United Kingdom ............... 249/104

Primary Examiner—William R. Dixon, Jr.
Attorney, Agent, or Firm—Bachman and LaPointe

[57] ABSTRACT

A forming and embossing template, especially for food products such as cookies, including a forming means having a body portion and peripheral cutting means having a desired configuration extending laterally therefrom, and an embossing means having a desired pattern carried by said body portion, whereby said cutting means form the shape of an article in said desired configuration, and said embossing means impresses the desired pattern on said article.

6 Claims, 6 Drawing Figures

FORMING AND EMBOSSING TEMPLATE

BACKGROUND OF THE INVENTION

Forming templates, such as cookie or pastry cutters or the like, are normally simply designed to cut out an article in a predetermined configuration. If a secondary design or pattern is desired on the formed article, a separate patterning device must be employed, especially if it is desired to apply the secondary design on a variety of configurations. This requires a separate tool which is detached from the main forming template which is inconvenient to use.

It is desirable to provide a single, composite tool which is suitable for forming the shape of article in a primary operation and for embossing the desired design or pattern thereon in a secondary operation.

Accordingly, it is a principal object of the present invention to provide a composite forming and embossing template which is simple and convenient to use.

It is a further object of the present invention to provide a template as aforesaid wherein the embossing means is carried by the forming means, and wherein the embossed pattern may be applied on the formed article by simply reversing the forming tool.

Further objects and advantages of the present invention will appear from the ensuing specification.

SUMMARY OF THE INVENTION

In accordance with the present invention, the foregoing objects and advantages may be readily obtained. The forming and embossing template of the present invention includes a forming means having a body portion and peripheral cutting means having a desired configuration extending laterally therefrom, and an embossing means having a desired pattern carried by said body portion, preferably releasable, whereby said cutting means subsequently forms the shape of an article in said desired configuration in a primary operation and said embossing means impresses the desired pattern on said article in a secondary operation. The template of the present invention is particularly useful as a food forming template, such as a pastry or cookie cutter.

In a preferred embodiment the cutting means are flanges which extend from said body in a first direction generally perpendicular thereto, and the embossing means are carried by said body in a second direction opposed to said flanges, so that after the desired configuration is formed in said article the template is reversed to impress the desired pattern thereon by said embossing means.

The template of the present invention achieves several significant advantages. It combines the forming and embossing features in a single, easy to use tool. As indicated above, the tool can simply be reversed after the forming operation to emboss the desired pattern on the article. Also, since the embossing means is carried by the body portion, this acts as a guide to direct proper placement of the embossment on the article. The embossing means is preferably releasable so that it may be conveniently used with a variety of differently shaped forming means in the same convenient manner.

DETAILED DESCRIPTION

The template of the present invention includes a forming means 1 having a body portion 2 and peripheral cutting means 3 having any desired configuration such as a circular configuration as shown, or also, for example, a square, oval, rectangular or serrated configuration, extending laterally from the body portion and integral therewith. The cutting means are preferably flanges which extend from the body portion in a first direction generally perpendicular to the body portion.

Figure 3:
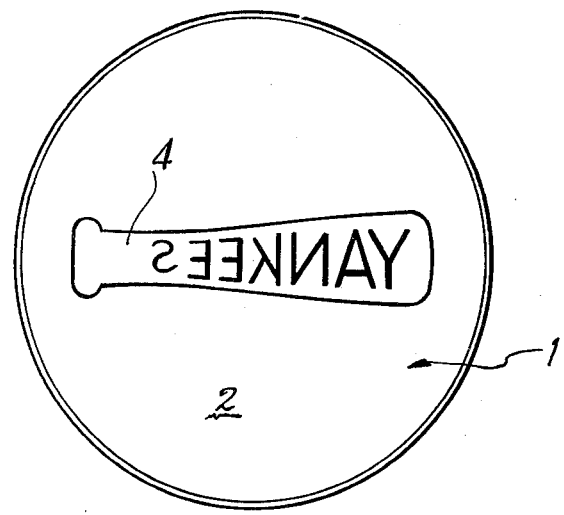
FIG. 3 is a top view of the template of FIG. 1 showing the embossing means in place.
Figure 4:
FIGS. 4 and 5 are alternate embodiments showing the resultant formed articles.
Figure 5:
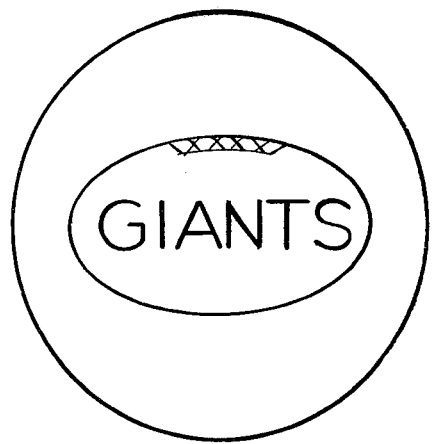
Figure 6:
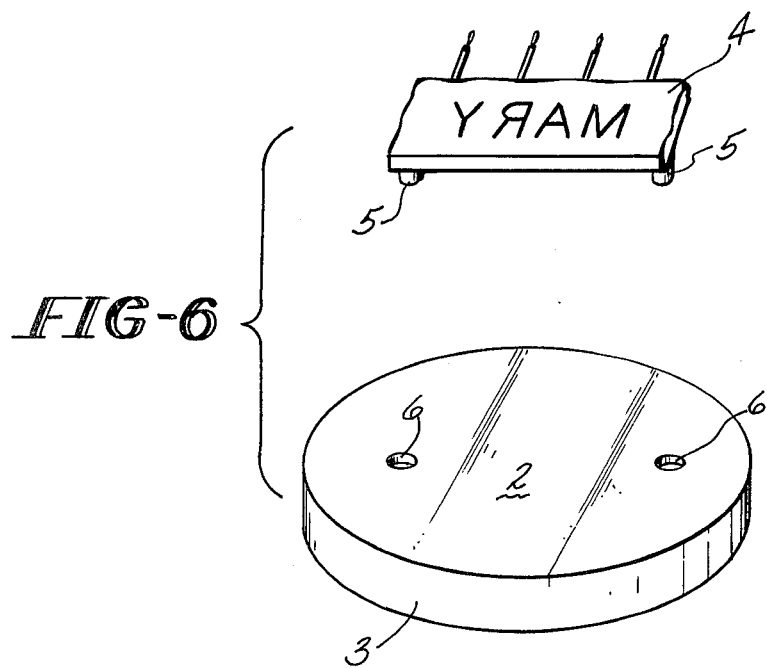
FIG. 6 is the template for forming the article of FIG. 4, showing the embossing means separated from the forming means.

An embossing means 4 is carried by the body portion 2. The embossing means may have any desired pattern for impressing on the article formed by the cutting means, such as the basball bat shape plus word YANKEES as shown in FIG. 3, or the football shape plus word GIANTS as shown in FIG. 5, or the cake shape plus word MARY as shown in FIGS. 4 and 6, or any other desired pattern. A pattern plus word embossment may be employed as shown, or simply the pattern alone or the words alone. Naturally, the desired pattern on the embossing means is contained in a mirror image as shown in FIGS. 3 and 6 so that it will be in a proper orientation in the desired article as shown in FIGS. 4 and 5.

The embossing means 4 is carried by the body portion 2 by means of flanges 5 which seat in a corresponding groove 6 in the body portion 2 so that the embossing means may simply be press fitted in place and is releasably secured to the body portion. Naturally, other means may be used for releasably securing the embossing means in place, such as providing flanges on the body portion which seat in corresponding grooves in the embossing means. The feature of releasability represents a considerable advantage of the present invention since it enables the embossing means to be attached to different forming means so that the embossment may be readily used on a virtually infinite variety of article shapes.

Figure 2:
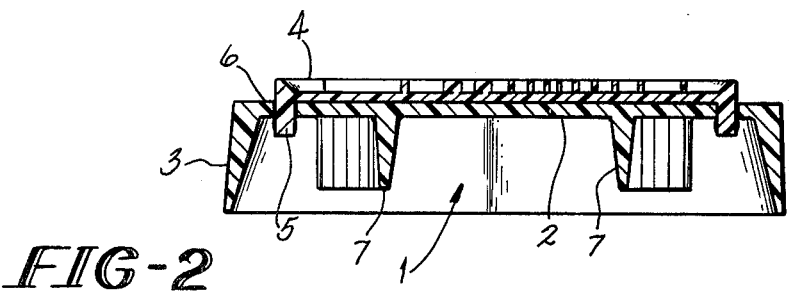
FIG. 2 is a section view taken along the line II—II of FIG. 1.

In the preferred embodiment the cutting means are flanges which extend from the body portion in a first direction generally perpendicular thereto as shown clearly in FIG. 2 and the embossing means is carried by the body in a second direction opposed to the flanges, also as clearly shown in FIG. 2. Therefore, it can be seen that the embossing means is carried by the body portion in such a way that the desired pattern is impressed in a second step subsequent to the formation of the shape of the article. After the desired configuration is formed by the cutting means, the template is simply reversed to impress the desired pattern thereon by the embossing means. This represents a very simple and convenient operating procedure.

Figure 1:
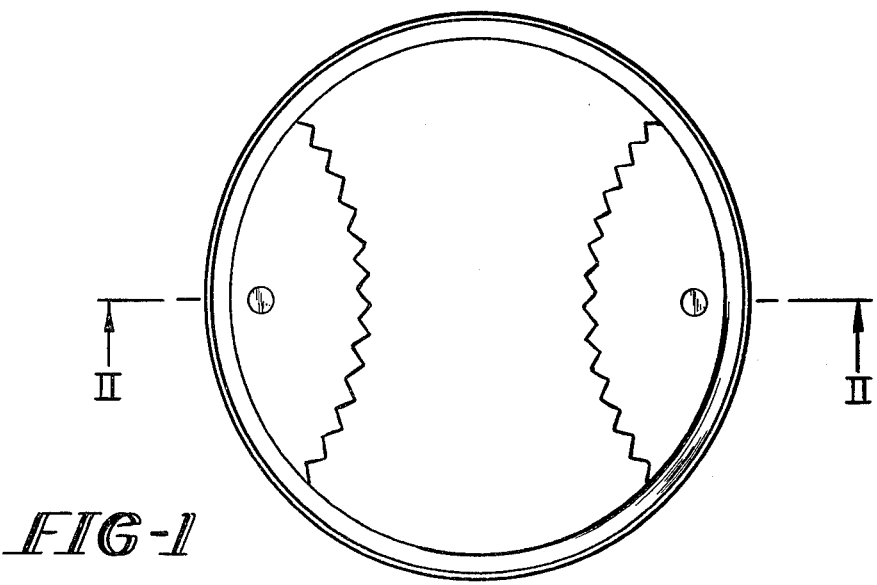
FIG. 1 is a bottom view of a template of the present invention.

If desired, secondary embossing means 7 may be provided extending from the body portion 2 in substantially the same direction as the cutting means 3 with the ends thereof spaced above the ends of the cutting means so that a secondary pattern may be impressed in the article, such as the baseball stitching shown in FIG. 1.

Naturally, if the baseball stitching is used as shown in the embodiment of FIGS. 1-3, the team name should be placed in the open area so as not to overlap the stitching, i.e., in a lateral orientation when viewing FIG. 1.

Any desired rigid material may be employed, compatible with the article being formed, such as metal or plastic.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A forming and embossing template including a forming means having a body portion and peripheral cutting means having a desired configuration extending laterally therefrom, and an embossing means having a desired pattern releasably carried by said body portion, whereby said cutting means form the shape of an article in said desired configuration in a primary operation and said embossing means subsequently impresses the desired pattern on said article in a secondary operation, wherein the embossing means and body portion are interchangeable with different embossing means and different body portions, said cutting means are flanges which extend from said body in a first direction generally perpendicular thereto, and wherein said embossing means is carried by said body in a second direction opposed to said flanges so that after said desired configuration is formed in said article the template is reversed to impress the desired pattern thereon by said embossing means, wherein said template includes secondary embossing means extending from said body portion in substantially the same direction as said flanges with said secondary embossing means being located directly beneath and proximate to said embossing means.

2. A template according to claim 1 wherein said body includes at least one groove which seats a corresponding flange in said embossing means for releasably carrying same.

3. A template according to claim 1 which is a food forming template.

4. A template according to claim 3 wherein said template is a cookie cutter, wherein said cutting means form the shape of the cookie and wherein the embossing means impresses a desired pattern thereon.

5. A template according to claim 1 wherein the embossing means is carried by the body so that the desired pattern is impressed in a second step subsequent to the formation of the shape of the article.

6. A template according to claim 1 wherein said secondary embossing means are located at least in part spaced from the edges of said template to provide a secondary pattern at least in part spaced from the edges of said article.

* * * * *